US007280952B2

(12) United States Patent
Butler et al.

(10) Patent No.: US 7,280,952 B2
(45) Date of Patent: Oct. 9, 2007

(54) WELL PLANNING USING SEISMIC COHERENCE

(75) Inventors: Edgar L. Butler, Bartlesville, OK (US); Scott A. Runnestrand, Bartlesville, OK (US); Dennis B. Neff, Grove, OK (US)

(73) Assignee: ConocoPhillips Company, Houston, TX (US)

(*) Notice: Subject to any disclaimer, the term of this patent is extended or adjusted under 35 U.S.C. 154(b) by 823 days.

(21) Appl. No.: 10/354,218

(22) Filed: Jan. 28, 2003

(65) Prior Publication Data

US 2004/0148148 A1  Jul. 29, 2004

(51) Int. Cl.
*G06G 7/48* (2006.01)
*G06F 7/60* (2006.01)
(52) U.S. Cl. ............................................ 703/10; 703/2
(58) Field of Classification Search .................. 703/10, 703/2
See application file for complete search history.

(56) References Cited

U.S. PATENT DOCUMENTS

| | | | |
|---|---|---|---|
| 5,018,112 A | 5/1991 | Pinkerton | |
| 5,563,949 A | 10/1996 | Bahorich | |
| 5,706,194 A | 1/1998 | Neff et al. | |
| 5,835,882 A | 11/1998 | Vienot et al. | |
| 5,835,883 A | 11/1998 | Neff et al. | |
| 5,884,229 A | 3/1999 | Matteucci | |
| 6,092,025 A | 7/2000 | Neff | |
| 6,223,126 B1* | 4/2001 | Neff et al. | 702/16 |
| RE38,229 E* | 8/2003 | Marfurt et al. | 702/16 |

\* cited by examiner

*Primary Examiner*—Hugh Jones
(74) *Attorney, Agent, or Firm*—Kameron D. Kelly; Ryan N. Cross

(57) ABSTRACT

A system for predicting hydrocarbon production from a subterranean region of interest using reflection seismic data. The system sets a drainage area around reference traces and defines drainage pathways extending outwardly from the reference trace towards the perimeter of the drainage area. A mathematical combination of the trace-to-trace coherence factors and reservoir quality attributes along each drainage pathway is calculated for each reference trace, thereby providing an indication of both initial and sustained hydrocarbon production from that location.

21 Claims, 7 Drawing Sheets
(2 of 7 Drawing Sheet(s) Filed in Color)

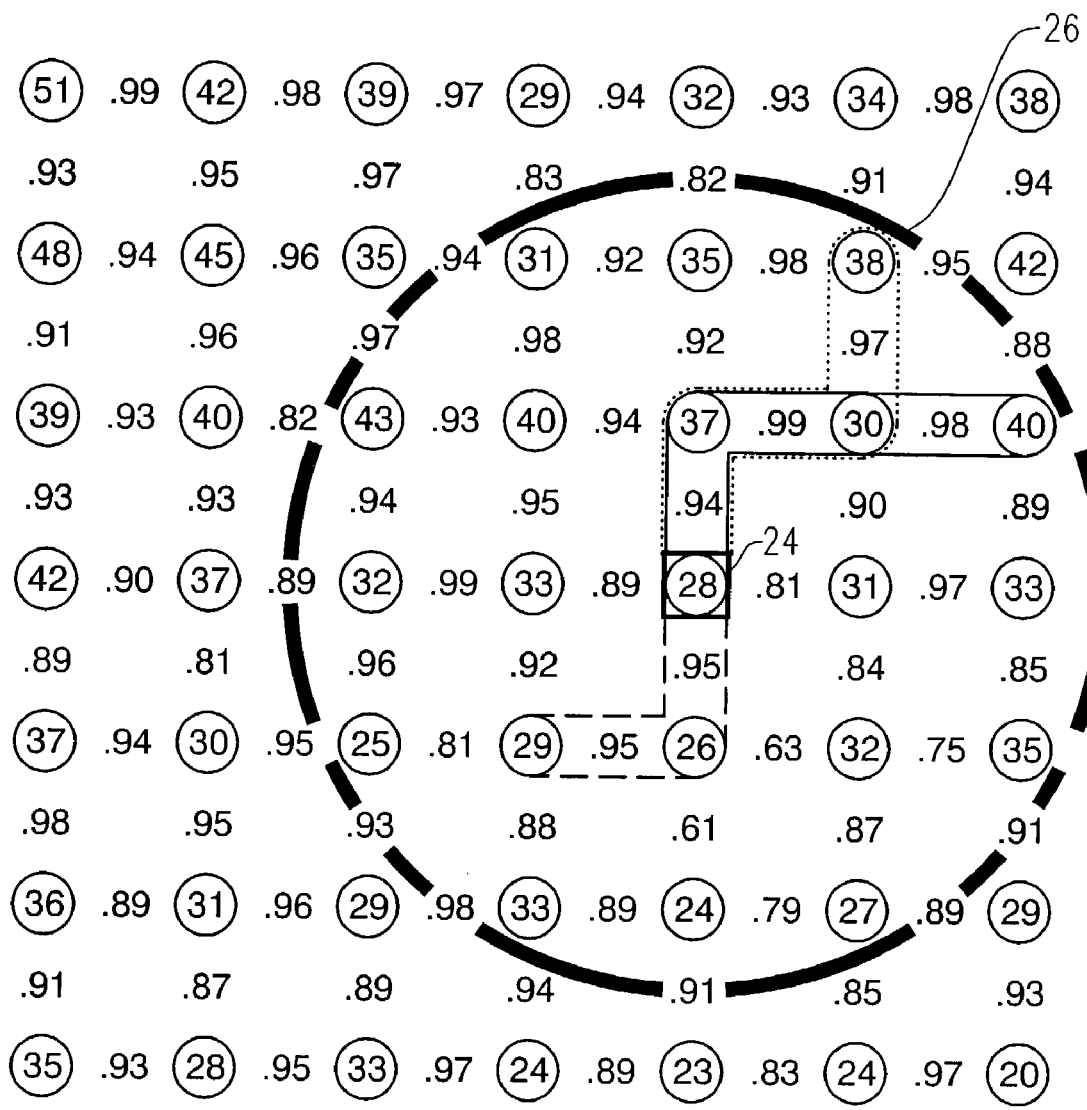
 REFERENCE TRACE #2
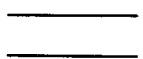 PATH P$_1$
 PATH P$_2$
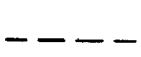 PATH P$_3$
*FIG. 4*

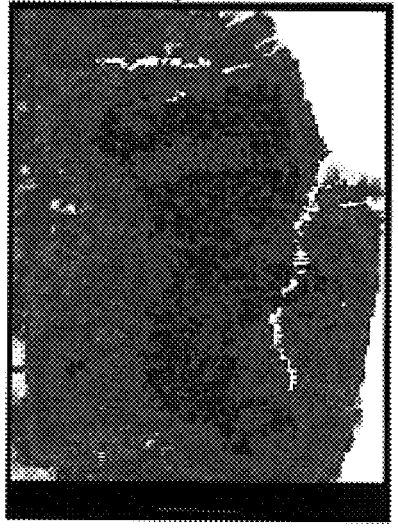
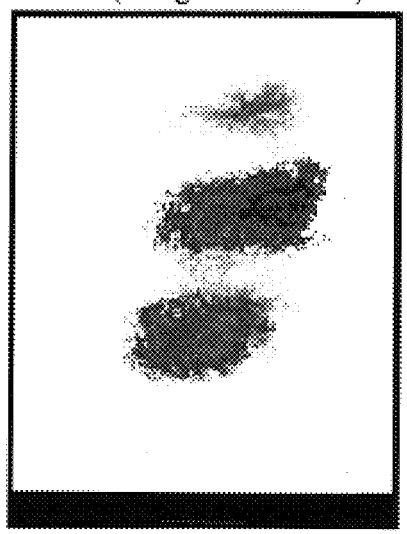
FIG. 9        FIG. 10
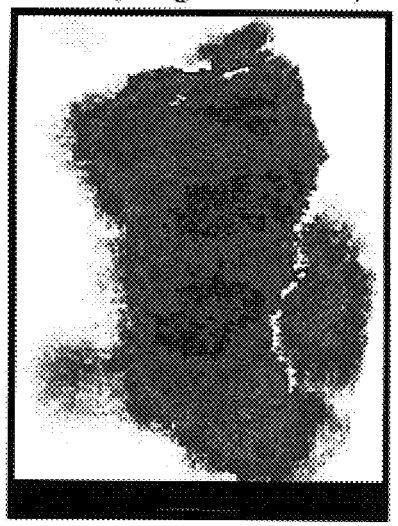
FIG. 11

WELL PLANNING USING SEISMIC COHERENCE

BACKGROUND OF THE INVENTION

1. Field of the Invention

The present invention relates generally to methods for predicting hydrocarbon production from a subterranean formation using reflection seismic data. In another aspect, the invention concerns a method of predicting hydrocarbon production from a subterranean formation based upon reservoir quality values and seismic coherence factors determined from reflection seismic data.

2. Description of the Prior Art

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earths surface. Offshore, air gun sources and hydrophone receivers are commonly used. The acoustic waves generated in the earth by these sources are transmitted back from strata boundaries and/or other discontinuities and reach the earth's surface at varying intervals of time, depending on the distance traversed and the characteristics of the subsurface traversed. On land these returning waves are detected by the geophones, which function to transduce such acoustic waves into representative electrical analog signals, which are generally referred to as traces. In use on land, an array of geophones is laid out along a grid covering an area of interest to form a group of spaced apart observation stations within a desired locality to enable construction of three dimensional (3D) views of reflector positions over wide areas. The source, which is offset a desired distance from the geophones, injects acoustic signals into the earth, and the detected signals at each geophone in the array are recorded for later processing using digital computers, where the analog data is generally quantized as digital sample points, e.g., one sample every two milliseconds, such that each sample point may be operated on individually. Accordingly, continuously recorded seismic field traces are reduced to vertical cross sections, or volume representations, or horizontal map views which approximate subsurface structure. The geophone array is then moved along to a new position and the process is repeated to provide a seismic survey. A 3D seismic survey is data gathered at the surface and presented as a volume representation of a portion of the subsurface.

After exploration of an area is completed, data relating to energy detected at a plurality of geophones will have been recorded, where the geophones are located at varying distances from the shotpoint. The data is then reorganized to collect traces from data transmitted at various shotpoints and recorded at various geophone locations, where the traces are grouped such that the reflections can be assumed to have been reflected from a particular point within the earth (i.e., a common midpoint). The individual records or "traces" are then corrected for the differing distance the seismic energy travels through the earth from the corresponding shotpoints, to the common midpoint, and upwardly to the various geophones. This step includes correction for the varying velocities through rock layers of different types and changes in the source and receiver depths. The correction for the varying spacing of shotpoint/geophone pairs is referred to as "normal move out." After this is done the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoint data, and is well known to those skilled in the art. Accordingly, seismic field data undergoes the above-mentioned corrections, and may also undergo migration, which is an operation on uninterpreted data and involves rearranging of seismic information so that dipping horizons are plotted in their true location. Other more exotic known processing techniques may also be applied, which for example enhance display of faults, stratigraphic features, amplitude versus offset (AVO) or some attribute such as peak amplitude, instantaneous frequency or phase, polarity etc., before the continuously recorded traces are reduced to vertical or horizontal cross sections or horizontal map views.

It is generally known that certain seismic attributes (e.g., seismic amplitude) of seismic data generated from a reflection seismic survey can approximate reservoir quality (e.g., thickness, porosity, saturation, or net pore feet). It is also known that initial hydrocarbon flow from a well is typically controlled by reservoir quality. However, many wells that exhibit high levels of initial production quickly taper off due to lack of geologic connectivity around the well. Wells with high geologic connectivity have the potential to produce at relatively steady rates for long periods of time. Thus, total well production at a certain location can be estimated by looking at both reservoir quality and geologic connectivity. It is known that seismic coherence is an indicator of geologic connectivity, and that hydrocarbon flow paths tend to follow common geology. Thus, reflection seismic data can provide an indication of both reservoir quality (initial flow) and geologic connectivity (sustained flow).

Although a number of techniques for determining trace-to-trace coherence factors (which indicate geologic connectivity) are known in the art, conventional seismic coherence determination methods only compare each trace to a fixed geometry of its neighboring traces. Thus, the trace-to-trace coherence values only provide an indication of very localized geologic connectivity between adjacent traces. In reality, however, oil and natural gas can flow from as much as 3,000 or 5,000 feet away from a well. Thus, conventional seismic coherence methods do not provide an accurate indication of the geologic connectivity of an entire field.

OBJECTS AND SUMMARY OF THE INVENTION

It is, therefore, an object of the present invention to provide a method for predicting hydrocarbon production from a subterranean formation using seismic attributes predictive of reservoir quality (e.g., seismic amplitude) and seismic attributes predictive of geologic connectivity (e.g., seismic coherence).

Another object of the invention is to provide a method for predicting hydrocarbon production from a subterranean formation using reflection seismic data to estimate hydrocarbon flow paths that extend a substantial distance from a center/reference trace.

It should be understood that the above-listed objects are only exemplary, and not all the objects listed above need be accomplished by the invention claimed herein. Other objects and advantages of the invention will be apparent from the following detailed description of the preferred embodiment, claims, and drawing figures.

Accordingly, in one embodiment of the present invention, there is provided a computer-implemented method for predicting hydrocarbon production from a subterranean region of interest using reflection seismic data. The reflection seismic data includes a plurality of laterally spaced stacked seismic traces representative of the region of interest. The inventive method comprises the steps of: (a) defining a reference trace within the region of interest; (b) defining a drainage area around the reference trace; (c) calculating trace-to-trace coherence factors for pairs of adjacent seismic traces within the drainage area; (d) defining drainage pathways extending outwardly from the reference trace, through the adjacent seismic traces, and towards the perimeter of the drainage area; and (e) using the trace-to-trace coherence factors located along each drainage pathway to calculate a composite coherence value for each pathway.

In another embodiment of the present invention, there is provided a computer-implemented method for predicting hydrocarbon production from a subterranean region of interest using reflection seismic data. The reflection seismic data includes a plurality of laterally spaced stacked seismic traces representative of the region of interest. The inventive method comprises the steps of: (a) defining a reference trace within the region of interest; (b) defining a lateral drainage area around the reference trace; (c) calculating trace-to-trace coherence factors for pairs of adjacent seismic traces within the drainage area; (d) defining a plurality of drainage pathways extending outwardly from the reference trace, through the seismic traces, and towards the perimeter of the drainage area, with each drainage pathway having at least one coherence factor and at least one reservoir quality attribute associated therewith, the reservoir quality attribute being predictive of the reservoir rock quality or the quantity of hydrocarbon in the region of interest; (e) mathematically combining the coherence factors and at least one reservoir quality attribute for each pathway to thereby generate a pathway production value for each pathway; and (f) mathematically combining the pathway production values for all the drainage pathways to thereby calculate a composite production value for the reference trace.

In a further embodiment of the present invention, there is provided a computer-implemented method for predicting hydrocarbon production from a subterranean region of interest using reflection seismic data. The reflection seismic data includes a plurality of laterally spaced stacked seismic traces representative of the region of interest. The inventive method comprises the steps of: (a) defining an upper horizon in the zone of interest; (b) defining a lower horizon in the zone of interest, with the upper and lower horizons defining a horizon window therebetween and the horizon window having a time or depth thickness; (c) calculating trace-to-trace coherence factors for pairs of adjacent seismic traces within the horizon window; (d) defining a center trace within the horizon window; (e) defining a circular drainage area surrounding the center trace and within the horizon window; (f) defining a threshold pathway coherence value; (g) defining all possible drainage pathways extending outwardly from the center trace towards the perimeter of the drainage area, with the drainage pathways being defined along the adjacent seismic traces, and the drainage pathways extending only where the product of all the coherence factors along the pathway is greater than the threshold pathway coherence value; (h) multiplying coherence factors and reservoir quality attributes of the seismic traces located along each pathway to thereby generate a pathway production value for each pathway, with the reservoir quality attributes being seismic-derived attributes that are predictive of rock quality or hydrocarbon quantity in the horizon window (i) summing the pathway production values for all the pathways to thereby calculate a composite production value for the center trace.

In a still further embodiment of the present invention, there is provided a program storage device readable by a computer. The device tangibly embodies a program of instructions executable by the computer for predicting hydrocarbon production from a subterranean region of interest using reflection seismic data. The reflection seismic data includes a plurality of laterally spaced seismic traces representative of the region of interest. The program of instructions comprising the steps of: (a) defining a reference trace within the region of interest; (b) defining a drainage area around the reference trace; (c) calculating trace-to-trace coherence factors for pairs of adjacent seismic traces within the drainage area; (d) defining drainage pathways extending outwardly from the reference trace, through the adjacent seismic traces, and towards the perimeter of the drainage area; and (e) using the trace-to-trace coherence factors located along each drainage pathway to calculate a composite coherence value for each pathway.

In yet another embodiment of the present invention, there is provided an apparatus for predicting hydrocarbon production from a subterranean region of interest using reflection seismic data. The reflection seismic data includes a plurality of laterally spaced stacked seismic traces representative of the region of interest. The apparatus comprises a computer programmed to carry out the following method steps: (a) defining a reference trace within the region of interest; (b) defining a drainage area around the reference trace; (c) calculating trace-to-trace coherence factors for pairs of adjacent seismic traces within the drainage area; (d) defining drainage pathways extending outwardly from the reference trace, through the adjacent seismic traces, and towards the perimeter of the drainage area; and (e) using the trace-to-trace coherence factors located along each drainage pathway to calculate a composite coherence value for each pathway.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

A preferred embodiment of the present invention is described in detail below with reference to the attached drawing figures, wherein:

FIG. 4 is the grid of seismic traces shown in FIG. 3, particularly illustrating a different trace being selected as the reference trace and the drainage area being defined around the new reference trace;

FIG. 9 is a composite production value map of the subterranean formation shown in FIG. 6 generated using the computer implemented method of the present invention, particularly illustrating the composite production values when a product weight factor of 0.2 is employed;

FIG. 10 is a composite production value map similar to the map illustrated in FIG. 9, particularly illustrating the composite production values when a product weight factor of 8 is employed; and FIG. 11 is a composite production value map similar to the map illustrated in FIG. 9, particularly illustrating the composite production values when a product weight factor of 2 is employed.

DETAILED DESCRIPTION OF THE PREFERRED EMBODIMENT

Figure 1:
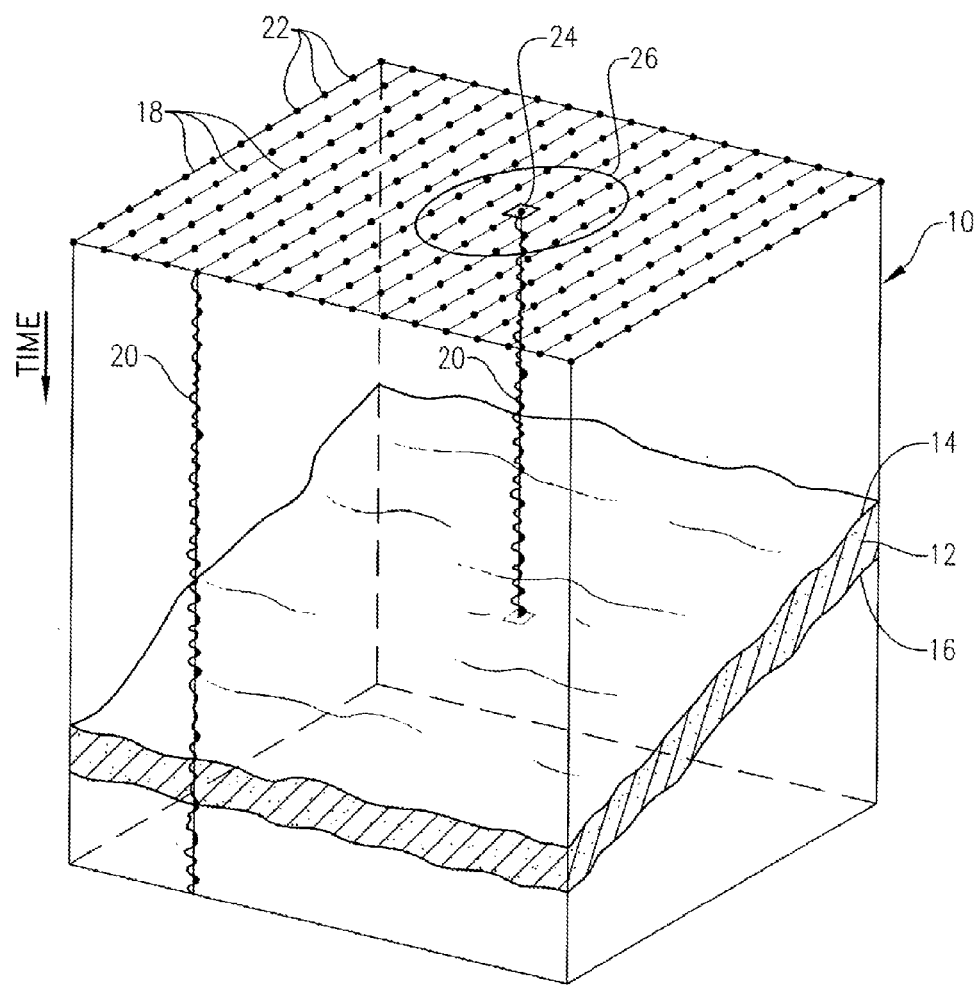
FIG. 1 is a perspective view of a subterranean region of interest, particularly illustrating the surface grid array of seismic traces and a horizon window of a subsurface formation bounded by upper and lower horizons.

Referring initially to FIG. 1, a subterranean region of interest 10 is illustrated as containing a horizon window 12 of subsurface strata bounded by upper and lower horizons 14,16. The subsurface strata located above upper horizon 14 and below lower horizon 16 have been deleted for clarity. A 3D seismic survey has been conducted, processed, and interpreted for subterranean region of interest 10. As is well known in the art, 3D seismic data typically comprise a set of substantially parallel 2D survey lines, such as survey lines 18, each of which consists of a series of stacked seismic traces 20 (only 2 shown for clarity) located at laterally spaced positions 22 along survey line 18. Each stacked seismic trace 20 shows the two-way seismic signal travel time to the various reflection events. Time $t_0$ typically represents the surface of the earth, although any other horizontal datum maybe used if desired.

Figure 2:
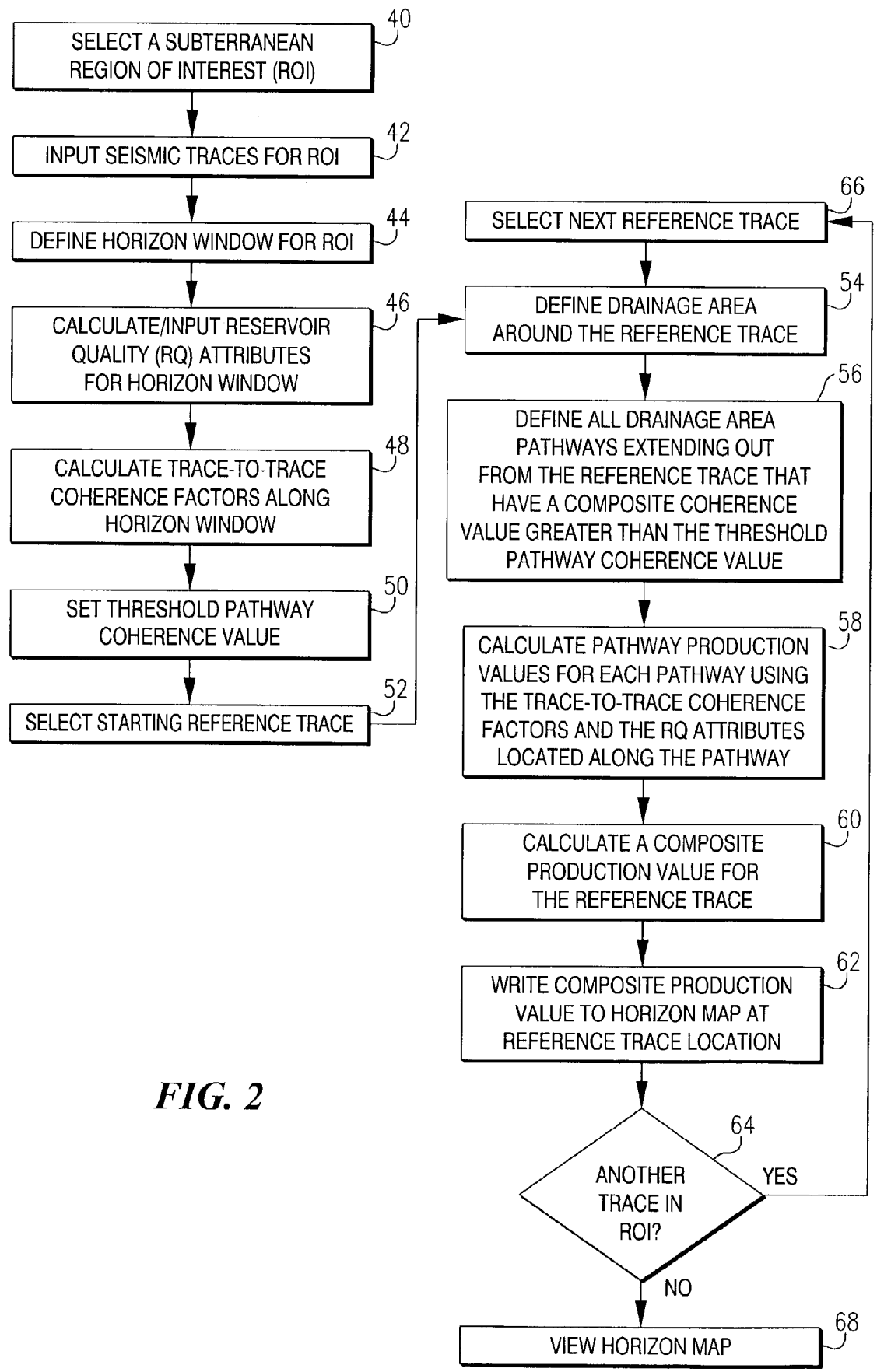
FIG. 2 is a computer flow chart outlining the inventive steps involved in predicting hydrocarbon production from a subterranean region of interest using reflection seismic data.

Referring to FIG. 2, in initial step 40 of the present invention, a subterranean region of interest is selected. The subterranean region of interest is typically a region where there is believed to be produceable quantities of oil or gas. The present invention can be employed to aid in determining whether and at what location a well should be drilled in the subterranean region of interest. In step 42 (FIG. 2), the laterally spaced stacked seismic traces representing the region of interest are inputted into the computer for further manipulation. In step 44, upper and lower horizons in the subterranean region of interest are defined. The time window between the upper and lower horizons is shown in FIG. 1 as horizon window 12.

In step 46 (FIG. 2), reservoir quality attributes for the horizon window are inputted or calculated using conventional techniques. Referring to FIG. 1, the reservoir quality attributes are derived from the portions of seismic traces 20 located between upper and lower horizons 14,16. The reservoir quality attributes can be any of a number of seismic-derived attributes predictive of reservoir quality (i.e., initial hydrocarbon flow). The most common example of a reservoir quality attribute that is predictive of initial hydrocarbon flow is amplitude.

In step 48 (FIG. 2), trace-to-trace coherence factors along the horizon window are calculated. Referring to FIG. 1, the trace-to-trace coherence factors are generated via a comparison of the portions of adjacent seismic traces 20 located between upper and lower horizons 14,16. The trace-to-trace coherence factors can be calculated using any of a number of conventional techniques for measuring waveform similarity of the seismic traces in horizon window 12. The most common measure of waveform similarity is the normalized correlation coefficient which is a measure of linear relationship between two waveforms. The major limitation of this measure is that it only considers the waveform shape and not absolute amplitude. Thus, two waveforms can have drastically different absolute amplitudes, but have a high correlation coefficient. In cases where absolute amplitude should also be considered in a similarity test, the normalized sample difference can be combined with the normalized correlation coefficient to determine an RB factor. The normalized correlation coefficient is a fairly well known measure. Given two time series ($A_i$ and $B_i$) of length N, the normalized correlation coefficient ($X_{(a,\ b)}$) is calculated as:

$$X_{(a,b)} = \frac{\sum_{i=1}^{N} a_i \cdot b_i}{\sqrt{\sum_{i=1}^{N} a_i^2} \cdot \sqrt{\sum_{i=1}^{N} b_i^2}}$$

where the length N is a comparison window corresponding to the selected time, or depth interval that includes the horizon window 12 (FIG. 1). The normalized sample difference ($D_{(a,\ b)}$) is defined as follows:

$$D_{(a,b)} = \frac{\sum_{i=1}^{N}(|a_i| + |b_i|) - \sum_{i=1}^{N}|a_i - b_i|}{\sum_{i=1}^{N}(|a_i| + |b_i|)}$$

This yields a difference coefficient that is a similar form to the correlation coefficient in that two identical waveforms will yield a coefficient of 1.0.

The RB factor is then defined as the weighted average of the two measures as follows:

$$RB(a,\ b) = wX_{(a,\ b)} + (1-w)D_{(a,\ b)}$$

where w is a weighting factor between 0 and 1 (commonly w is set to 0.5 for equal weighting). The value of an RB factor can range from 0 to 1, with higher RB factors indicating greater waveform similarity. In accordance with step 48 (FIG. 2), it is preferred for RB factors to be calculated for each trace in the horizon window 12 (FIG. 1).

Figure 3:
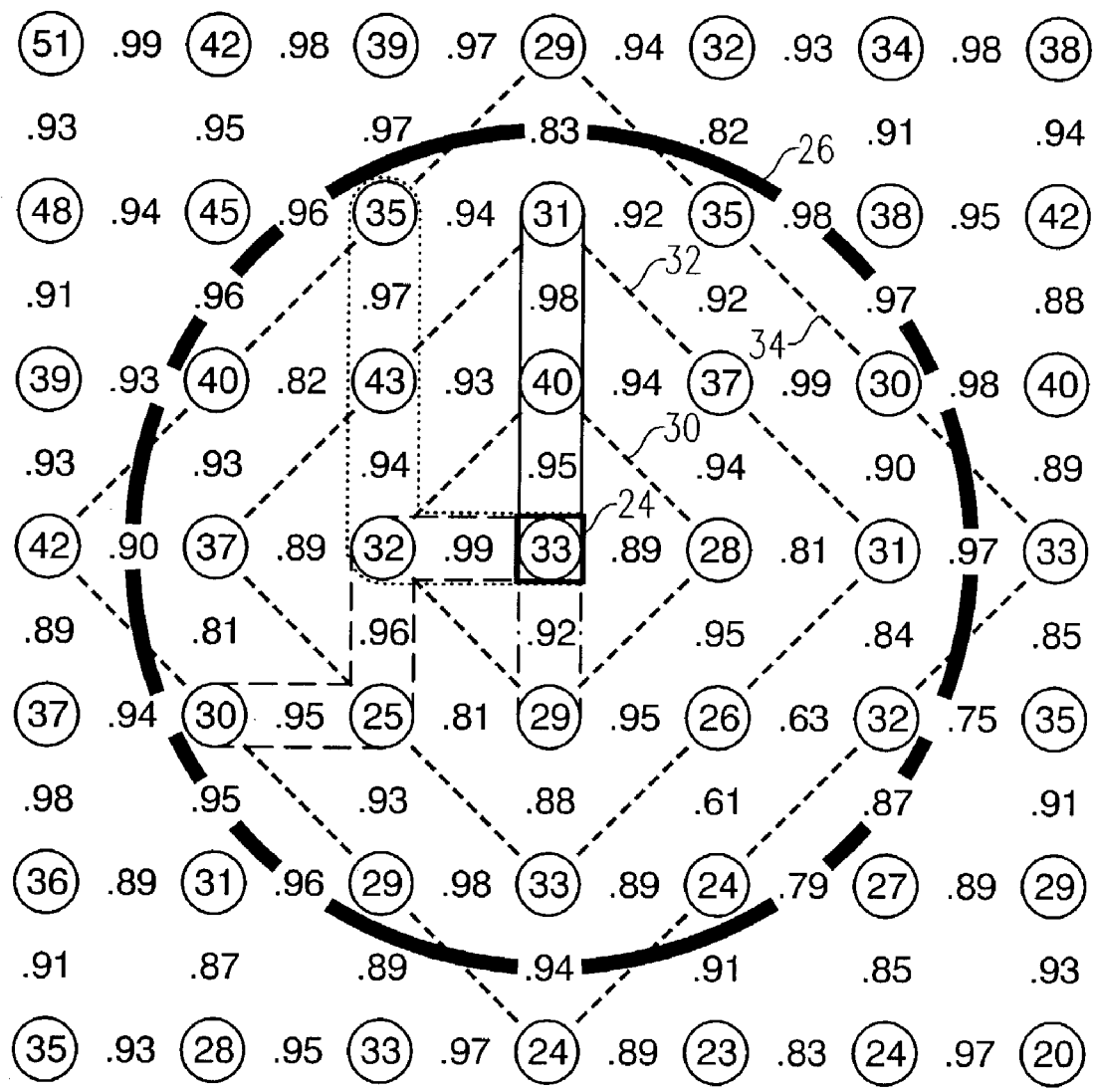
FIG. 3 is a grid of laterally spaced stacked seismic traces (represented by small circles) each having an attribute value (represented by a numerical value within the circles) and a plurality of trace-to-trace coherence factors (represented by numerical values between the circles), particularly illustrating a reference trace and a circular drainage area defined around the reference trace.

Referring to FIG. 3, a grid of laterally spaced stacked seismic traces representing the horizon window is illustrated. Each seismic trace is depicted as a circle with the attribute value for the trace in the horizon window being located within the circle. Further, a trace-to-trace coherence factor (e.g., RB factor) is defined between pairs of adjacent seismic traces in the horizon window. In step 50 (FIG. 2), a threshold pathway coherence value is set. Determination of the value of the threshold pathway coherence value is typically an iterative process that is data dependent. The significance of the threshold pathway coherence value will be described below with reference to step 56. In step 52 (FIG. 2), a starting reference trace is selected. In step 54, a drainage area around the reference trace is defined.

FIGS. 1 and 3 show a reference trace 24 and a drainage area 26 defined around reference trace 24. Typically, drainage area 26 will be a circular area defined by selecting a drainage radius that extends from reference trace 24 to the perimeter of drainage area 26. However, drainage area 26 could be defined as having another geometric shape such as, for example, square or rectangular. The size of drainage area 26 can be selected based upon the drainage properties of the subterranean formation in the horizon window as well as the type of hydrocarbon expected to be produced from the horizon window. For example, if the subterranean formation in the horizon window is expected to contain heavy black oil, a 40-acre area may be appropriate for drainage area 26 due to the restricted flow of heavy oil. However, if dry gas is expected to be produced from the subterranean formation in the horizon window, a 640-acre drainage area might be more appropriate due to better flow characteristics.

In step 56 (FIG. 2), drainage pathways extending from reference trace 24 towards the perimeter of drainage area 26 are defined. The existence and length of the various drainage pathways defined in step 56 are dependent upon the coherence values between seismic traces located along the pathway. Drainage pathways extend only where the composite coherence value (i.e., the product of all coherence values along the pathway) is greater than the threshold pathway coherence value defined in step 50.

Referring to FIG. 3, drainage pathways $P_1$, $P_2$, $P_3$, and $P_4$, which extend outwardly from reference trace 24, have been defined in accordance with step 56 (FIG. 2). The first step in defining the drainage pathways is to compare the coherence factors between reference trace 24 and its neighboring traces to the threshold pathway coherence value. The threshold pathway coherence value is a number between 0 and 1 that controls the length and number of drainage pathways defined in step 56 (FIG. 2). Lower values for the threshold pathway coherence value result in more and longer drainage pathways, while higher values for the threshold pathway coherence value result in fewer and shorter drainage pathways. Typical values for the threshold pathway coherence value range from about 0.50 to about 0.95. In FIG. 3, the threshold pathway coherence value was set at 0.90. Thus, no drainage pathway is defined between reference trace 24 and the seismic trace just east of reference trace 24 because the coherence factor (i.e., 0.89) between these adjacent seismic traces is less than the threshold pathway coherence value (i.e., 0.90). However, drainage pathways were defined between reference trace 24 and its northern, western, and southern neighboring seismic traces because the coherence factors (i.e., 0.95, 0.99, and 0.92, respectively) between reference trace 24 and these adjacent seismic traces exceeded the threshold pathway coherence value (i.e., 0.90). Thus, drainage pathways $P_1$, $P_2$, and $P_3$ are defined between reference trace 24 and its northern, western, and southern neighboring traces, respectively. The second step in defining the drainage pathways is to move outwardly from reference trace 24 to its neighboring traces that define a drainage pathway. Starting with the northern neighbor of reference trace 24 in FIG. 3, drainage pathway $P_1$ can be extended only to adjacent seismic traces that (1) are farther from the reference trace than the northern neighbor of the reference trace, and (2) produce a composite coherence value (i.e., the product of all coherence values along the pathway) that is greater than the threshold pathway coherence value. Thus, drainage pathway $P_1$ cannot be extended to the east of the northern neighbor of reference trace 24 because the composite coherence value of that proposed pathway (i.e., 0.95×0.94=0.89) would be less than the threshold pathway coherence value (i.e., 0.90). Similarly, drainage pathway $P_1$ cannot be extended to the west of the northern neighbor of reference trace 24 because the composite coherence value of that proposed pathway (i.e., 0.95×0.93=0.88) would be less than the threshold pathway coherence value (i.e., 0.90). However, drainage pathway $P_1$ can be extended to the north of the northern neighbor of reference trace 24 because the composite coherence value of that pathway (i.e., 0.95×0.98=0.93) is greater than the threshold pathway coherence value (i.e., 0.90). As for drainage pathway $P_2$ which extends between reference trace 24 and its western neighbor, this pathway can be extended both in the northern and southern directions because the composite coherence values for the extended paths are greater than the threshold pathway coherence value. Thus, pathway $P_2$ is extended to the trace just north of the western neighbor of reference trace 24, while a new drainage pathway $P_4$ is defined and extended to the trace just south of the western neighbor of reference trace 24. As for drainage pathway $P_3$, this path cannot be extended because extension of pathway $P_3$ in any direction away from reference trace 24 would result in a composite coherence value less than the threshold pathway coherence value. In a similar fashion to that described above, pathways $P_1$, $P_2$, and $P_4$ can be extended to seismic traces within drainage area 26 that result in a composite coherence value for the pathway that is greater than the threshold pathway coherence value. This process of extending the pathways only to traces where the composite coherence value is greater than the threshold pathway coherence value is repeated until extension of the pathways would require extension to a trace located outside drainage area 26. Thus, step 56 defines all drainage area pathways extending out from the reference trace that have a composite coherence value greater than the threshold pathway coherence value.

Figure 5:
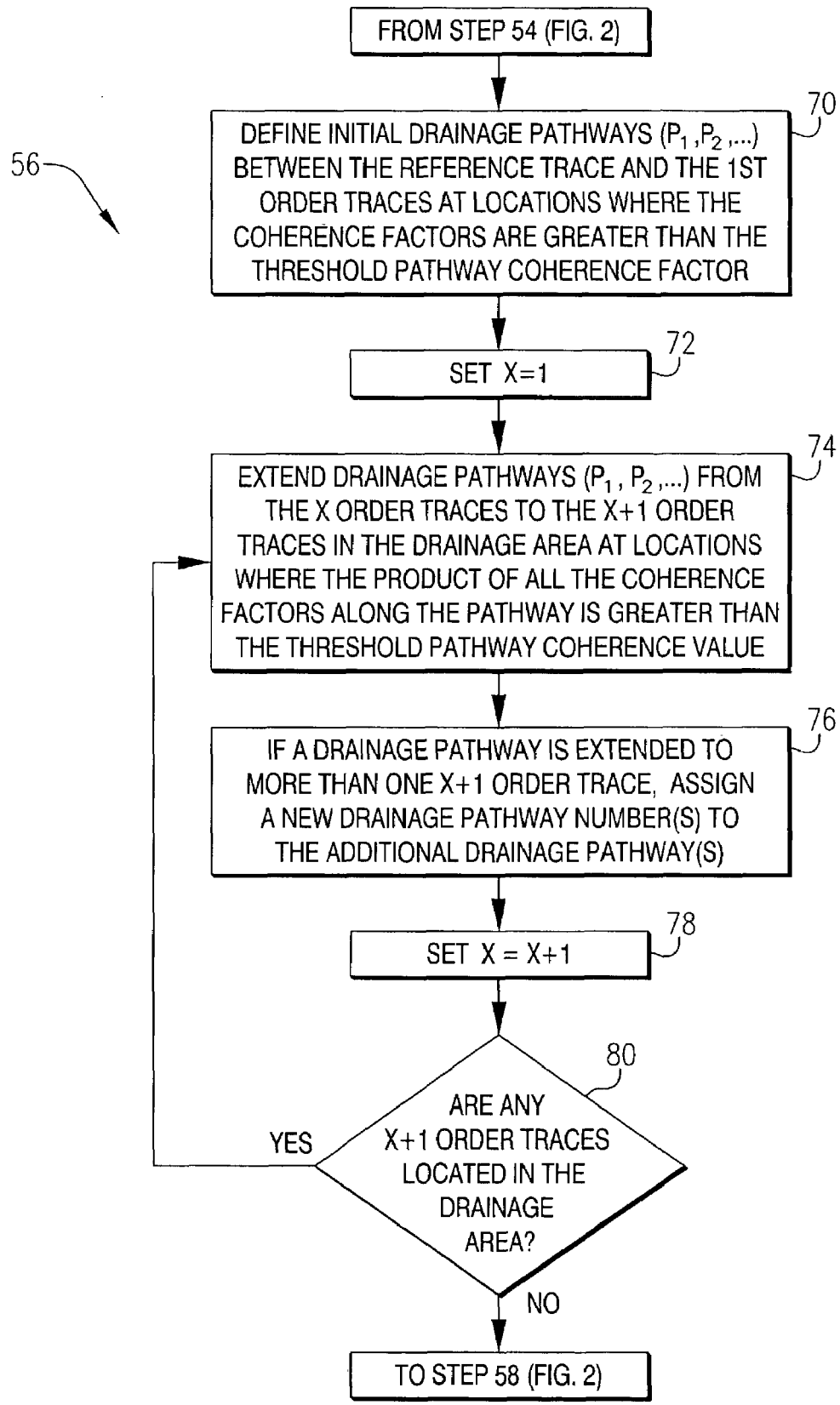
FIG. 5 is a computer flow chart outlining the substeps of step 56 from FIG. 2, particularly outlining the manner in which drainage pathways extending outwardly from the reference trace towards the perimeter of the drainage area are defined.

Referring now to FIG. 5, in one embodiment of the present invention, step 56 (FIG. 1) can be broken out into substeps 70-80. Substeps 70-80 in FIG. 5 are best understood when concurrently referring to FIG. 3, which identifies a group of first order traces 30, a group of second order traces 32, and a group of third order traces 34. First order traces 30 are immediately adjacent reference trace 24, second order traces 32 are spaced further from reference trace 24 than first order traces 30, and third order traces 34 are spaced further from reference trace 24 than second order traces 32. In step 70 (FIG. 5), initial drainage pathways between reference trace 24 and first order traces 30 at locations where the coherence factors are greater than the threshold pathway coherence value are defined. In step 72, the variable "X" is set equal to 1. In step 74, the drainage pathways defined in step 70 are extended from the X order traces to the X+1 order traces in the drainage area at locations where the product of all the coherence factors along the pathway (i.e., the composite coherence value) is greater than the threshold pathway coherence value that was set in step 50 (FIG. 2). In substep 76 (FIG. 5), new drainage pathway numbers are assigned to additional drainage pathways at locations where a drainage pathway is extended to more than one X+1 order trace. In substep 78, X is set equal to X+1. In substep 80, the computer asks whether any X+1 order traces are located in the drainage area. If any X+1 order traces are located in the drainage area, steps 74-80 are repeated for those traces. If no X+1 order traces are located in the drainage area, the computer proceeds to step 58 (FIG. 2).

Referring again to FIG. 2, in step 58, pathway production values for each drainage pathway defined in step 56 are calculated using the trace-to-trace coherence factors and the reservoir quality attributes located along the pathway. The pathway production value calculated in step 58 can be calculated using any mathematical combination (e.g., product, sum, etc.) of the coherence factors and reservoir quality attributes located along the pathway. Preferably, the resulting pathway production value is positively correlated to both the coherence factors and the reservoir quality attributes along the pathway. As used herein, the term "positively correlated" denotes a mathematical relationship between an inputted variable and a resulting solution computed from the input variable, wherein if the value of the inputted variable is increased then the value of the resulting solution increases and if the value of the inputted variable is decreased then the value of the resulting solution is decreased. Thus, step 58 should be performed in a manner such that an increase in the value of the coherence factors or reservoir quality attributes results in an increase in the calculated pathway production values, while a decrease in the value of the coherence factors or reservoir quality attribute results in a decrease in the calculated pathway production values. For example, for pathway $P_1$ in FIG. 3, the pathway production value could be calculated by multiplying the reservoir quality attributes and composite coherence values along pathway $P_1$ to produce the pathway production value (i.e., 33×0.95×40×0.98×31=38,096). Preferably, a product weight factor is used to adjust the amount of influence that the reservoir quality attributes have on the pathway production value relative to the composite coherence value for the pathway. It is preferred for the product weight factor to be employed as an exponent of the product of the reservoir quality attributes. For example, for pathway $P_1$ in FIG. 3, the pathway production value with a product weight factor of 0.2 could be calculated by multiplying the composite coherence value for pathway $P_1$ by the product of the reservoir quality attributes of pathway $P_1$ raised to the power of 0.2 (i.e., $0.931 \times (33 \times 40 \times 31)^{0.2} = 7.79$).

In step 60 (FIG. 2), a composite production value for the reference trace is calculated. The composite production value for the reference trace can be calculated by mathematically combining all the pathway production values for the reference trace. The composite production value calculated in step 60 should be positively correlated with each of the pathway production values used to calculate it. Preferably, the composite production value for the reference trace is simply the sum of all pathway production values for that reference trace.

In step 62 (FIG. 2), the composite production value for the reference trace is written to a horizon map at a location corresponding to the location of the reference trace. In step 64, the computer asks whether another trace in the region of interest needs to be analyzed. If not all traces in the region of interest have been employed as the reference trace, step 66 selects another seismic trace in the region of interest as the "next" reference trace. FIG. 4 illustrates the selection of another seismic trace as the next reference trace, with the eastern neighbor of the original reference trace illustrated in FIG. 3 being selected as the next reference trace. Steps 54-64 (FIG. 2) can then be repeated for the next reference trace. Once all seismic traces in the region of interest have been employed as the reference trace, the horizon map generated in step 62 can be viewed in step 68 using any conventional seismic viewing tool.

Referring now to FIGS. 3 and 4, the following mathematical computations show the manner in which the composite coherence values, radial coherence, pathway production values, and composite production values for reference traces #1 and #2 (shown in FIGS. 3 and 4, respectively) can be generated. These exemplary calculations illustrate one possible manner in which the composite coherence values, radial coherence, pathway production values, and composite production values can be generated. It should be understood that the present invention is not limited by the following exemplary calculations.

Calculation of Composite Coherence Value
(Threshold=0.90)

Reference Trace #1 (FIG. 3)

Path $P_1$: 0.95*0.98=0.931

Path $P_2$: 0.99*0.94*0.97=0.903

Path $P_3$: 0.99*0.96*0.95=0.912

Path $P_4$: 0.92=0.920

Reference Trace #2 (FIG. 4)

Path $P_1$: 0.94*0.99*0.98=0.912

Path $P_2$: 0.94*0.99*0.97=0.903

Path $P_3$: 0.95*0.95=0.903

Calculation of Radial Coherence

Reference Trace #1 (FIG. 3): 0.931+0.903+0.912+0.920=3.666

Reference Trace #2 (FIG. 4): 0.912+0.903+0.903=2.718

Calculation of Pathway Production Value (Product Weight Factor=0.2

Reference Trace #1 (FIG. 3)

Path $P_1$: $0.931*(33*40*31)^{0.2}=7.79$

Path $P_2$: $0.903*(33*32*43*35)^{0.2}15.70$

Path $P_3$: $0.912*(33*32*25*30)^{0.2}=13.80$

Path $P_4$: $0.920*(33*29)^{0.2}=3.63$

Reference Trace #2 (FIG. 4)

Path $P_1$: $0.912*(28*37*30*40)^{0.2}=15.10$

Path $P_2$: $0.903*(28*37*30*38)^{0.2}=14.80$

Path $P_3$: $0.903*(28*26*29)^{0.2}=6.62$

Calculation of Composite Production Value

Reference Trace #1 (FIG. 3):
7.79+15.7+13.80+3.63=40.92

Reference Trace #2 (FIG. 4):
15.10+14.80+6.62=36.52

Figure 6:
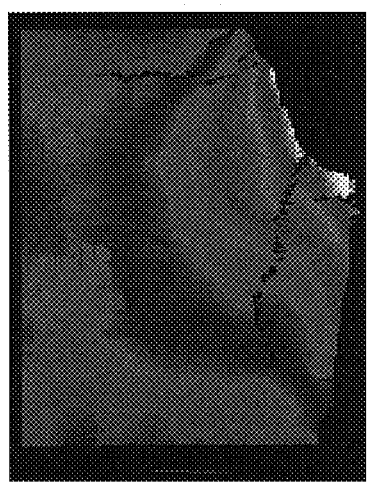
FIG. 6 is a computer generated map illustrating the "N" formation sand time structure of a subterranean formation.
Figure 7:
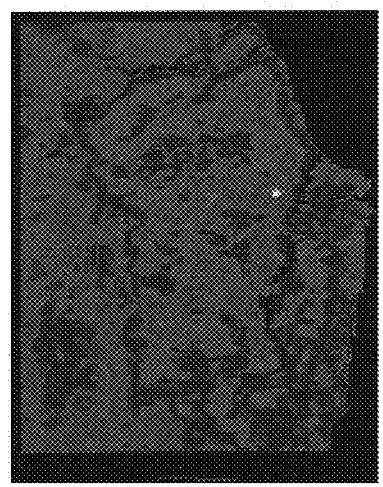
FIG. 7 is a computer generated map illustrating the "N" formation sand trough amplitude of the subterranean formation shown in FIG. 6.
Figure 8:
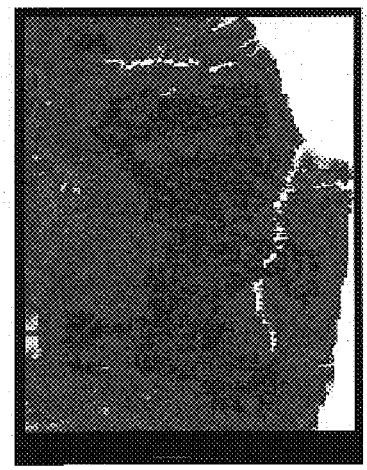
FIG. 8 is a computer generated map illustrating the radial coherence of the subterranean formation shown in FIG. 6.

Referring to FIG. 6, a computer generated structure map of an actual hydrocarbon production field is illustrated. The structure map illustrated in FIG. 6 is a time structure of the "N" formation sand. Referring to FIG. 7, a reservoir quality attribute map is illustrated for the structure shown in FIG. 6. The attribute map of FIG. 7 is color coded, with the red spots indicating high trough amplitude. The red spots in FIG. 7 are somewhat indicative of locations where high initial hydrocarbon flow can be expected. Referring to FIG. 8, a radial coherence map is illustrated for the subterranean structure shown in FIG. 6. The radial coherence map was generated using a drainage radius of 2,000 feet and a threshold pathway coherence value of 0.75. FIGS. 7 and 8 show that the areas with the highest reservoir quality attribute values (shown in FIG. 7) are not necessarily coincident with the areas of highest radial coherence (shown in FIG. 8).

Referring to FIG. 9, a computer generated composite production value map is illustrated for the structure shown in FIG. 6. The composite production value map shown in FIG. 9 was generated using a product weight factor of 0.2. FIG. 10 shows a composite production value map similar to the one illustrated in FIG. 9; however, a product weight factor of 8 was employed to generate the map in FIG. 10. FIG. 11 shows a composite production value map similar to the maps in FIGS. 9 and 10; however, a product weight factor of 2 was used to generate the map. It can be seen in FIG. 9 that when a small product weight factor is employed, the resulting composite production value map looks similar to the radial coherence map shown in FIG. 8. FIG. 10 shows that when a large product weight factor is employed, the resulting composite production value map more closely resembles the reservoir quality attribute map of FIG. 7. FIG. 11 illustrates that when a moderate product weight factor is employed in calculating the composite production value map, the resulting map is a more blended map of the reservoir quality attribute map and radial coherence map. These composite production value maps provide a more accurate indication of total (i.e., initial and sustained) hydrocarbon production from various locations in the structure). Thus, the composite production value maps help determine whether and at what location a well should be drilled in the formation.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A computer-implemented method for predicting hydrocarbon production from a subterranean region of interest using reflection seismic data, said reflection seismic data including a plurality of laterally spaced stacked seismic traces representative of the region of interest, said method comprising the steps of:
    (a) defining a reference trace within the region of interest;
    (b) defining a drainage area around the reference trace;
    (c) calculating trace-to-trace coherence factors for pairs of adjacent seismic traces within the drainage area;
    (d) defining drainage pathways extending outwardly from the reference trace, through the adjacent seismic traces, and towards the perimeter of the drainage area;
    (e) using the trace-to-trace coherence factors located along each drainage pathway to calculate a composite coherence value for each pathway;
    (f) for each drainage pathway, using the composite coherence value for the pathway and a reservoir quality attribute for at least one seismic trace located along the pathway to calculate a pathway production value, said reservoir quality attribute being a seismic-derived attribute that is predictive of reservoir rock quality or hydrocarbon quantity in the region of interest; and
    (g) generating a map of at least a portion of the subterranean region of interest, said map being based at least in part on the composite coherence value.

2. The method of claim 1,
    said pathway production value being positively correlated with the composite coherence values and the reservoir quality attribute.

3. The method of claim 1,
    said pathway production value being a product of the composite coherence value and the reservoir quality attribute.

4. The method of claim 1,
    step (f) including using a product weight factor to control the relative effect of the composite coherence values and the reservoir quality attributes on the pathway production value.

5. The method of claim 4,
    said product weight factor being an exponent of the composite coherence value or the reservoir quality attribute.

6. The method of claim 1,
    said reservoir quality attribute being selected from the group consisting of thickness, porosity, saturation, and amplitude.

7. The method of claim 1; and
    (h) using the pathway production values for all the drainage pathways to calculate a composite production value for the reference trace.

8. The method of claim 7,
    said composite production value being positively correlated with the pathway production values for all the drainage pathways.

9. The method of claim 7,
    said composite production value being a sum of the pathway production values for all the drainage pathways.

10. A computer-implemented method for predicting hydrocarbon production from a subterranean region of interest using reflection seismic data, said reflection seismic data including a plurality of laterally spaced stacked seismic traces representative of the region of interest, said method comprising the steps of:
    (a) defining a reference trace within the region of interest;
    (b) defining a lateral drainage area around the reference trace;
    (c) calculating trace-to-trace coherence factors for pairs of adjacent seismic traces within the drainage area;
    (d) defining a plurality of drainage pathways extending outwardly from the reference trace, through the seismic traces, and towards the perimeter of the drainage area, each drainage pathway having at least one coherence factor and at least one reservoir quality attribute associated therewith, said reservoir quality attribute being predictive of the reservoir rock quality or the quantity of hydrocarbon in the region of interest;

(e) mathematically combining the coherence factors and at least one reservoir quality attribute for each pathway to thereby generate a pathway production value for each pathway;

(f) mathematically combining the pathway production values for all the drainage pathways to thereby calculate a composite production value for the reference trace; and (g) generating a map of at least a portion of the subterranean region of interest, said map being based at least in part on the composite production value.

11. The method of claim 10, said pathway production value for each drainage pathway being a product of all the coherence factors and reservoir quality attributes located along that pathway, said composite production value being a sum of all the pathway production values.

12. The method of claim 10, said seismic traces including first, second, and third groups of seismic traces, said first group of seismic traces being located adjacent the reference trace, said second group of seismic traces being spaced further from the reference trace than the first group of seismic traces, said third group of said seismic traces being spaced further from the reference trace than the second group of seismic traces, step (d) including the substeps of:

(d1) reading the coherence factors between the reference trace and the first group of seismic traces; and (d2) defining drainage pathways between the reference trace and the first group of seismic traces based on the coherence factors read in substep (d1).

13. The method of claim 12, substep (d2) including comparing the coherence factors read in substep (d1) to a threshold pathway coherence value and defining drainage pathways only where the coherence factor read in substep (d1) is greater than the threshold pathway coherence value.

14. The method of claim 13, step (d) including the substeps of:

(d3) reading the coherence factors between the first group of seismic traces and the second group of seismic traces; and (d4) extending at least one of the drainage pathways defined in substep (d2) from the first group of seismic traces to the second group of seismic traces based on the coherence factors read in substep (d1) and (d3).

15. The method of claim 14, substep (d4) including comparing the product of adjacent coherence factors read in substeps (d1) and (d3) to the threshold pathway coherence value and extending the drainage pathways only where the product of the adjacent coherence factors read in substeps (d1) and (d3) is greater than the threshold coherence value.

16. The method of claim 15, step (d) including the substeps of:

(d5) reading the coherence factors between the second group of seismic traces and the third group of seismic traces; and (d6) extending at least one of the drainage pathways defined in substeps (d2) and (d4) from the second group of seismic traces to the third group of seismic traces based on the coherence factors read in substeps (d1), (d3), and (d5).

17. The method of claim 16, substep (d6) including comparing the product of adjacent coherence factors read in substeps (d1), (d3), and (d5) to the threshold pathway coherence value and extending the drainage pathways only where the product of the adjacent coherence factors read in substeps (d1), (d3), and (d5) is greater than the threshold coherence value.

18. A computer-implemented method for predicting hydrocarbon production from a subterranean region of interest using reflection seismic data, said reflection seismic data including a plurality of laterally spaced stacked seismic traces representative of the region of interest, said method comprising the steps of:

(a) defining an upper horizon in the zone of interest;

(b) defining a lower horizon in the zone of interest, said upper and lower horizons defining a horizon window therebetween, said horizon window having a time or depth thickness;

(c) calculating trace-to-trace coherence factors for pairs of adjacent seismic traces within the horizon window;

(d) defining a center trace within the horizon window;

(e) defining a circular drainage area surrounding the center trace and within the horizon window;

(f) defining a threshold pathway coherence value;

(g) defining all possible drainage pathways extending outwardly from the center trace towards the perimeter of the drainage area, said drainage pathways being defined along the adjacent seismic traces, said drainage pathways extending only where the product of all the coherence factors along the pathway is greater than the threshold pathway coherence value;

(h) multiplying coherence factors and reservoir quality attributes of the seismic traces located along each pathway to thereby generate a pathway production value for each pathway, said reservoir quality attributes being seismic-derived attributes that are predictive of rock quality or hydrocarbon quantity in the horizon window;

(i) summing the pathway production values for all the pathways to thereby calculate a composite production value for the center trace; and (j) generating a map of at least a portion of the subterranean region of interest, said map being based at least in part on the composite production value.

19. The method of claim 18; and (k) defining a new center trace within the horizon window, said new center trace being different from the center trace defined in step (d); and (1) repeating steps (e)-(i) for the new center trace.

20. The method of claim 18, step (h) including applying a product weight factor to the coherence factors or reservoir quality attributes to thereby adjust the relative amount of influence that the coherence factors and the reservoir quality attributes have on the value of the pathway production value.

21. The method of claim 20, step (h) including applying the product weight factor as an exponent of the coherence factors or the reservoir quality attributes.

* * * * *